(No Model.)
T. O. LOUGHLIN.
SAW.
No. 352,624. Patented Nov. 16, 1886.
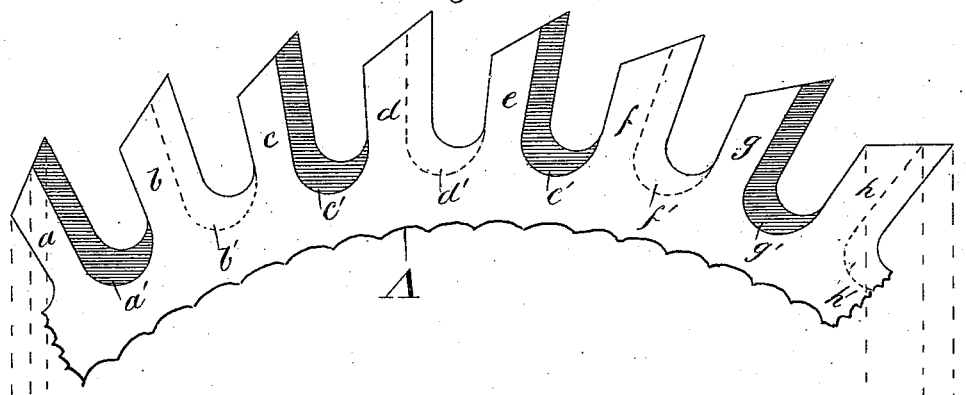
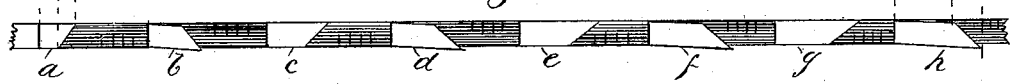
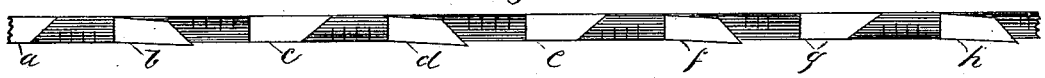
Witnesses
John Elliott
G. Elliott
Inventor
Terrence O Loughlin
per
William Gill
Atty

UNITED STATES PATENT OFFICE.

TERRENCE O. LOUGHLIN, OF SPANISH RIVER, ONTARIO, CANADA.

SAW.

SPECIFICATION forming part of Letters Patent No. 352,624, dated November 16, 1886.

Application filed June 19, 1886. Serial No. 205,646. (No model.)

*To all whom it may concern:*

Be it known that I, TERRENCE O. LOUGHLIN, of Spanish River, in the district of Algoma, in the Province of Ontario, Canada, machinist, have invented a new and useful Improvement in the Construction of the Teeth of Crosscut-Saws; and I do hereby declare that the following is a full, clear, and exact description of the same.

My invention relates to such crosscut-saws as are used chiefly for cutting the ends of boards when being manufactured at the sawmill, but may be used for other purposes when so required.

It consists, preferably, in the construction of the saw with an even number of teeth, and making the front of all the teeth with a knife-edge, and making those teeth whose cutting-edge is next to the board without any set—that is, the sides of the teeth to be in the same plane as the plate of the saw—and the intervening teeth, whose cutting-edge will be next to the end of the board, with a small portion of set. The teeth without set will cut the end of the board smooth and clean and produce a better class of marketable lumber thereby. Every alternate tooth in the saw has the cutting-edge on one side of the saw, and the other teeth have the cutting-edge on the opposite side of the saw.

In the accompanying drawings, Figure 1 is a side view of a portion of my saw. Fig. 2 is an edge view of the same, shown as if looking on the curved edge of the saw. Fig. 3 is an edge view showing the teeth as if they were on a straight line, for the purpose of showing the teeth and spaces more clearly than on a curved line.

Similar letters of reference indicate the same parts in all the views, as in this specification.

A represents a portion of the saw-plate with teeth $a\ b\ c\ d\ e\ f\ g\ h$, and the teeth marked $b\ d\ f\ h$ have a small portion of set, and the other teeth, $a\ c\ e\ g$, are without set, and are those teeth whose cutting-edge is next the board, and will cut the end thereof clean and smooth, as if dressed with a plane.

Referring to Fig. 1, it will be seen that the teeth $a\ c\ e\ g$ have the knife-edge clearly shown by the cross shade lines upon the bevel which forms the knife-edge, and that the said bevel terminates in a gullet having a still greater bevel, and marked $a'\ c'\ e'\ g'$, at the base of the teeth. The cutting-edge of the other teeth, $b\ d\ f\ h$, is pointed out by the dotted lines on said teeth, which also terminate in a gullet at the base of the teeth, these beveled gullets being for the purpose of relieving the teeth of the saw of the sawdust as it comes from the same.

Referring to Fig. 2, the teeth are shown as seen when looking on the curved edge of the saw, as shown by the dotted lines drawn between Figs. 1 and 2. The teeth $b\ d\ f\ h$ having set are clearly shown by their projecting sidewise from the saw. The teeth $a\ c\ e\ g$ are without any set, and do not project sidewise from the saw, but remain always in the same plane with the plate of the saw.

Referring to Fig. 3, it will be seen that the difference of this figure to Fig. 2 is that the spaces between the teeth are better shown from being laid out on a straight line.

In operating my saw it will be found that, in addition to its dressing the ends of the boards, it will run one full week, doing good work, without sharpening; and is therefore easier to keep in trim than the ordinary crosscut-saw.

Having thus described my invention, I claim—

A circular crosscut-saw constructed with teeth having a knife-edge on the front of each tooth, and terminating in a beveled gullet at the base of each tooth, and the face of the tooth running in a line to a point behind the center of the saw, each alternate tooth having the cutting-edge beveled in one direction, and the cutting-edge of the intervening teeth beveled in the opposite direction, the teeth which act on the end of the board being without set, and the teeth which act on the part being cut off having a small portion of set only, substantially as shown and described.

TERRENCE O. LOUGHLIN.

Witnesses:
 JAMES KEHOE,
 ROBT. T. PINE.